United States Patent [19]

Rezanka

[11] Patent Number: 4,833,491

[45] Date of Patent: May 23, 1989

[54] THERMAL INK JET PRINTER ADAPTED TO OPERATE IN MONOCHROME, HIGHLIGHT OR PROCESS COLOR MODES

[75] Inventor: Ivan Rezanka, Pittsford, N.Y.

[73] Assignee: Xerox Corporation, Stamford, Conn.

[21] Appl. No.: 206,778

[22] Filed: Jun. 15, 1988

[51] Int. Cl.[4] .............................................. G01D 15/16

[52] U.S. Cl. .................................... 346/140 R; 358/75

[58] Field of Search ..................... 346/140, 75; 358/75, 358/80

[56] References Cited

U.S. PATENT DOCUMENTS

| | | | |
|---|---|---|---|
| 4,463,359 | 7/1984 | Ayata et al. | 346/1.1 |
| 4,540,996 | 9/1985 | Saito | 346/140 R |
| 4,554,556 | 11/1985 | Hirata et al. | 346/49 |
| 4,571,599 | 2/1986 | Rezanka | 346/140 R |
| 4,596,990 | 6/1986 | Hou | 346/75 |
| 4,601,777 | 7/1986 | Hawkins et al. | 156/626 |

FOREIGN PATENT DOCUMENTS

| | | |
|---|---|---|
| 87370 | 5/1982 | Japan . |

*Primary Examiner*—Joseph W. Hartary

[57] ABSTRACT

A thermal ink jet printer has an ink delivery system which enables rapid changes and increased operational speeds when changing between full color, highlight color and monochrome mode of operation. In response to selection of a desired mode, ink supply systems associated with particular cartridges are selectively purged and interconnected to ink supply systems of the colored inks which will be used in the selected operational modes.

9 Claims, 5 Drawing Sheets

(PRIOR ART)

THERMAL INK JET PRINTER ADAPTED TO OPERATE IN MONOCHROME, HIGHLIGHT OR PROCESS COLOR MODES

BACKGROUND AND INFORMATION DISCLOSURE STATEMENT

This invention relates to thermal ink jet printing systems and, more particularly, to a printer incorporting an ink delivery system which enables operation, selectively, process color, monochrome or highlight color modes.

Thermal ink jet printers are well known in the prior art as exemplified by U.S. Pat. Nos. 4,463,359 and 4,601,777. In the systems disclosed in these patents, a thermal printhead comprises one or more ink-filled channels communicating with a relatively small ink supply chamber at one end and having an opening at the opposite end, referred to as a nozzle. A plurality of thermal energy generators, usually resistors, are located in the channels at a predetermined distance from the nozzle. The resistors are individually addressed with a current pulse to momentarily vaporize the ink and form a bubble which expels an ink droplet. As the bubble grows, the ink bulges from the nozzle and is contained by the surface tension of the ink as a meniscus. As the bubble begins to collapse, the ink still in the channel between the nozzle and bubble starts to move towards the collapsing bubble, causing a volumetric contraction of the ink at the nozzle and resulting in the separating of the bulging ink as a droplet. The acceleration of the ink out of the nozzle while the bubble is growing provides the momentum and velocity of the droplet in a substantially straight line direction towards a recording medium, such as paper.

Prior art thermal ink jet printers may operate in various process modes ranging from monochrome (black or white) to color highlighting; e.g. black and red; to full process color. For example, in U.S. Pat. No. 4,571,599, a multi-color thermal ink jet printer is disclosed, which utilizes four printheads with associated ink cartridges arranged linearly on a carriage which is moved past a recording medium. Each cartridge is filled with an ink appropriate for the color process mode selected. For a monochrome printing operation, each cartridge is filled with a black ink. For a color highlight mode, two cartridges may be filled with blank ink while two cartridges filled with, for example, magenta ink. For full process color, one carridge is filled with black ink while the other three are normally filled with cyan, magenta and yellow colored inks.

A severe disadvantage with prior art color printers is their lack of versatility if a change is desired in the color process mode. For example, if the system is operating in a full color process, and a switch to monochrome operation is desired, the chosen alternatives are to operate the system at the relatively slow color process speed, enabling only the cartridge having the blank ink, or replacing the three color cartridges with cartridges having blank ink. If the cartridge replacement mechanism is selected, the carriage can then be moved four times faster than in the process color mode. Generally, a change from a monochrome system (four black cartridges) to a process color system requires the replacement of three black cartridges by three color cartridges.

It would be desirable to provide a printing system which would be versatile enough to allow a rapid change in the ink delivery of the cartridges, thereby enabling changes between monochrome, color highlight and color process modes and without requiring cartridge replacement. The presnet invention is therefore directed towards a color printing system in which the inks contained in the cartridges are under operator control. The operator may select the particular combination of colors required for the process mode and initiate each reconfiguration operation while purging selected cartridges of the original ink supply and causing the selected cartridges to be refilled with an ink of the desired color. More particularly, the invention is directed towards a thermal ink jet printer including a reciprocating carriage adapted to convey a plurality of ink supply cartridges with integrally mounted thermal printheads forming a part thereof, means for stepping a recording medium a predetermined distance after each traversal of the carriage across the width of the recording medium, and means for propelling ink droplets from the nozzles of each printhead on demand, the printer further including:

a plurality of individual ink supply systems for supplying ink of a desired color to an associated ink cartridge, and means for purging at least one of said supply systems of the ink supply contained therein and for refilling said system with an ink from at least one of said other ink supply systems.

The following prior art references appear to be relevant:

U.S. Pat. No. 4,554,556 to Hirata et al teaches an ink jet color plotter used for printing both alphanumeric characters and color plots at a high speed. A printhead assembly is reciprocally mounted on a carriage. Cyan, magenta and yellow inks are supplied to ink chambers of ink ejection heads 32, 34 and 36. Black ink is fed to all the ink chambers of the heads 38 and 40.

U.S. Pat. No. 4,596,990 to Hou discloses an ink jet printer which utilizes from two to n jets in a single printhead. The jets are aligned in a straight line substantially parallel to the relative printing direction. The use of multiple jet allows the printing speed to be increased two to n times faster depending upon the number of jets used.

U.S. Pat. No. 4,540,996 to Saito teaches a high speed multicolor ink jet printer. A recording head unit 15 is provided with a plurality of recording means offset from each other at predetermined intervals so that double recording and omissions may be prevented. The head unit 15 is reciprocally mounted on a carriage for movement across a recording sheet.

DESCRIPTION OF THE INVENTION

Figure 1:
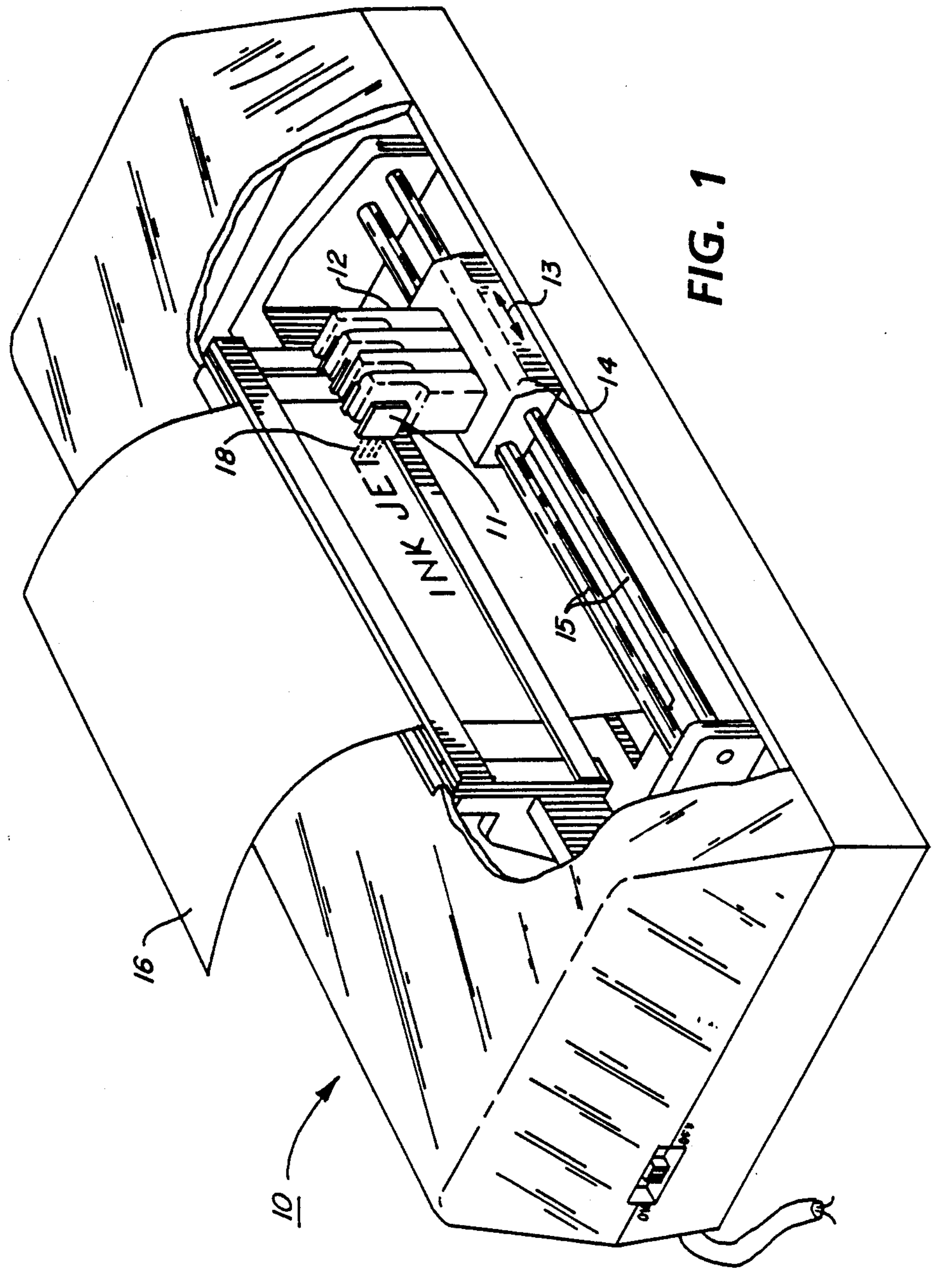
FIG. 1 is a schematic perspective view of a thermal ink jet printer having a plurality of ink cartridges with integral printheads.

Referring to FIG. 1, a multi-color thermal ink jet printer 10 is shown. Several ink supply cartridges 12, each with an integrally attached thermal printhead 11, are mounted on a translatable carriage. During the printing mode, the carriage reciprocates back and forth on guide rails 15 as depicted by arrow 13. A recording medium 16, such as, for example, paper, is held stationary while the carriage is moving in one direction and, prior to the carriage moving in a reverse direction, the recording medium is stepped a distance equal to the height of the stripe of data printed on the recording medium by the thermal printheads. Each printhead has a linear array of nozzles which are aligned in a direction perpendicular to the reciprocating direction of the carriage. The nozzles confront the recording medium and are spaced therefrom a distance of, for example, between 0.01 and 0.2 inch. The nozzles center-to-center spacing is about 3 mils, so that 300 spots or pixels per inch may be printed on the recording medium. The thermal printheads propel ink droplets 18 toward the recording medium whenever droplets are required, during the traverse of the carriage to print information. The signal-carrying ribbon cables attached to thermals of the printheads have been omitted for clarity. The required number of nozzles is a design choice based upon the desired number of traverses back and forth across the recording medium to print a full page of information.

Figure 2:
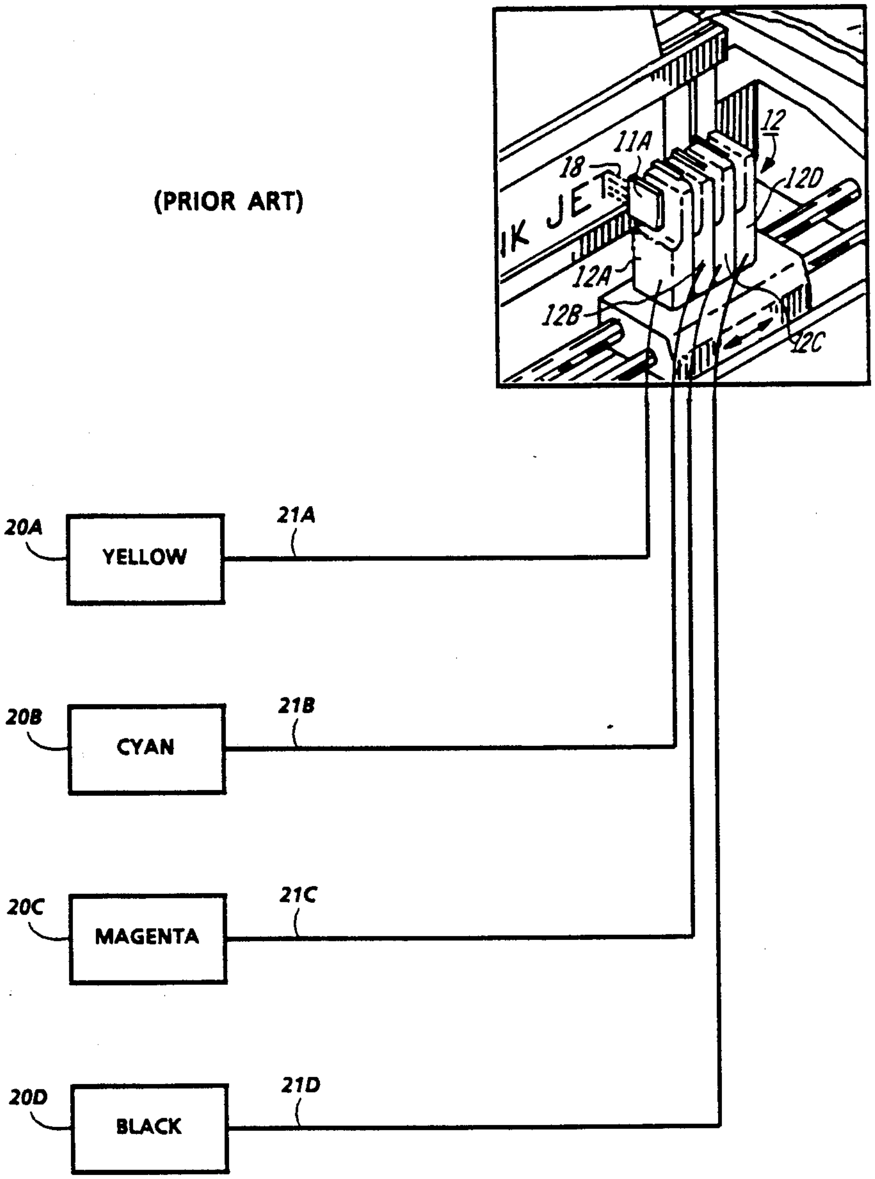
FIG. 2 shows a conventional ink supply system for the printheads shown in FIG. 1.
Figure 3:
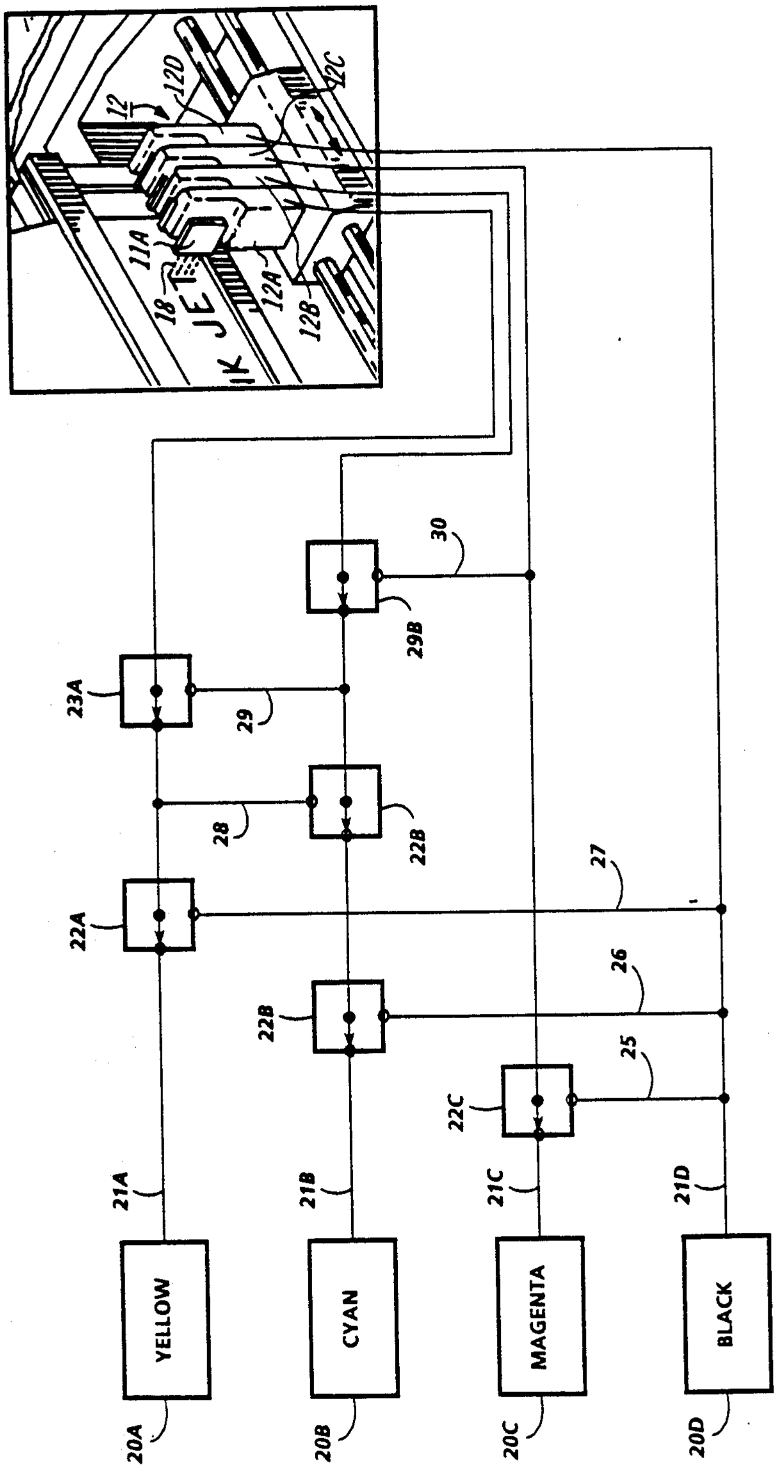
FIG. 3 shows the ink supply system of FIG. 2 modified according to the principles of the present invention.

For purposes of description, it will be assumed that four printheads and four associated ink cartridges, each with a separate color ink, are aligned as shown in the upper right corner of FIG. 2. FIG. 2 shows a conventional ink supply system connected to the ink cartridges 12A–12D. Ink supply cartridge 12A, connected to a primary yellow ink supply reservoir 20A via ink supply line 21A, supplies yellow ink to printhead 11A. Ink supply cartridge 12B, connected to a cyan ink supply reservoir 20B via ink supply line 21B, supplies cyan ink to printhead 11B. Ink supply cartridge 12C, connected to a magenta ink supply reservoir 20C via ink supply line 21C, supplies magenta ink to printhead 11C. Ink supply cartridge 12D, supplies black ink to a printhead 11D via ink supply line 21D. During operation, a constant, slightly negative, predetermined ink pressure at the nozzles is maintained. As ink is expelled from the printheads, the ink channels are refilled from ink supply reservoirs 20A–20D by capillary action. With this configuration, a full color process printing operation has a carriage speed of approximately 5 to 20 ips to obtain the full process color output. The total time taken for the carriage traverse will herein be defined as a base (1X) speed. This configuration has an inherent limitation in that, if a printing operation requires a different color combination, or a black and white (monochrome) operation, the printing function, if the printheads are not replaced, is limited to the slowest, 1X speed. For example, if a monochrome printing output was desired, the 1X speed would be required so that the single black printhead 11D provides the required output. Heretofore, the alternative to operating at the 1X speed was to replace one or more cartridges dependent on the revised printing function. For the monochrome example, cartridge 12A, 12B and 12C, and ink reservoirs 20A, 20B, 20C would be replaced by black cartridges and black ink reservoirs, respectively. The speed could be then increased by a factor of 4. The present invention realizes the same type of increased output efficiency without requiring the replacement of cartridges or ink supplies. This objective is realized by modifying the ink supply system of FIG. 2 to enable an individual ink supply line purging operation succeeded by a diversion of one or more inks into alternate supply lines. As shown in FIG. 3, a number of electronically controlled, two-way flow valves have been introduced into the ink supply lines. Valves 22A and 23A are introduced into supply line 21A, valves 22B, 23B, 24B are introduced into supply line 21B, valve 22C is introduced into supply line 21C. Additional interconnecting lines 25–30 have been added to provide ink communication between lines upon activation of the associated valves, as will be seen. During a full color operational mode, all of the two-way valves are set as shown so as to permit ink flow only along the supply line associated with each reservoir.

Figure 4:
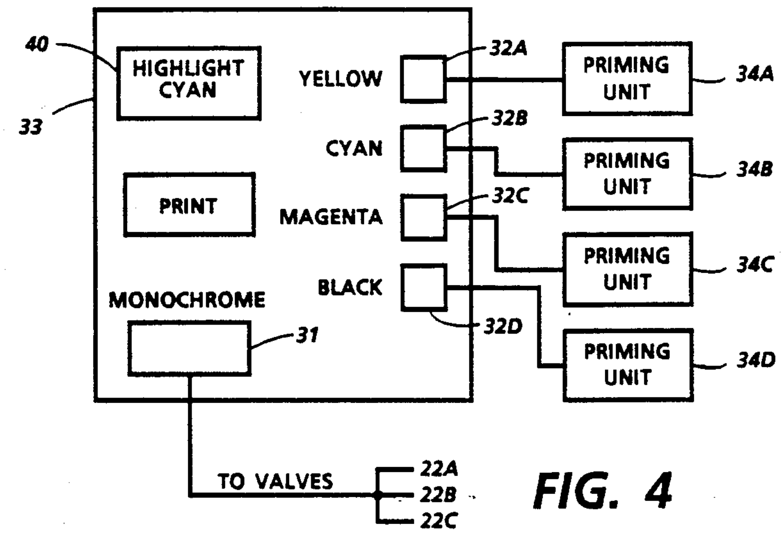
FIG. 4 illustrates a control system for varying the ink supply system connections.
Figure 5:
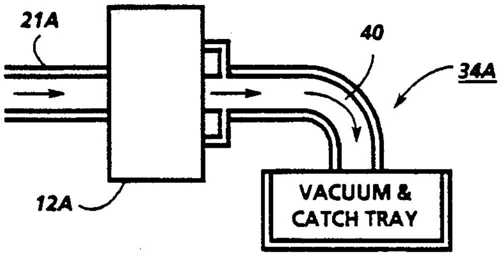
FIG. 5 shows a side view of a purging unit attached to one of the printheads.

Consider next a change in operation from a full color operation to a monochrome mode. FIG. 4 shows a control system suitable to effect a changeover in the ink supply system, so that all cartridges are supplied with black ink to enable a 4X increase in print operation. The first step is to purge cartridges 12A, 12B, 12C and their associated supply lines of the particular color ink. This is done by depressing MONOCHROME switch 31 located on a portion of a control panel 33. This action sends a signal to valves 22A, 22B, 22C, changing the valve connection and connecting line 21A to 21D (valve 22A), line 22B to 21D (valve 22B) and line 21C to 21D (valve 22C). The carriage is also moved into a purge and reprime location which can be to the right of the printhead position shown in FIG. 1; e.g. outside the normal end-of-print position. A plurality of purging units 34A–34D are positioned so as to enable a vacuum source to be connected into the ink channels of each ink channel. In this case, priming units 34A, 34B and 34C are actuated. FIG. 5 shows, in side view, priming unit 34A in the purge-prime orientation. Tubing 40 is placed in air-tight position over the ink channel being supplied by line 21A. A suitable vacuum source is connected to tubing 40, creating the suction force to urge the ink from in the ink channel and the supply line 21A into a suitable catch tray. At this point, black ink from supply line 21D begins to enter supply lines 21A, 21B, 21C along lines 27, 26, and 25, respectively, which have been connected by the repositioning of valves 22A, 22B, 22C. The ink flow being expelled into the catch tray at each priming unit is monitored until a flow of black ink is achieved from all of the three selected lines at which time the purge and reprime operation is completed. The printheads can then be disengaged from the priming units and the carriage returned to the normal start-of-print position. A full monochrome operation may now be enabled by selecting the PRINT function.

Other operational modes of operation are consistent with the principles of the present invention. For example, a highlight color operation may be desired to create a partial monochrome output copy with cyan highlighted areas. For this mode, the magenta and yellow lines would be purged and reprimed and valves interconnecting the cyan and yellow lines and the black and magenta lines activated. The operator would depress the HIGHLIGHT CYAN switch 40 initiating the purging of lines 21A and 21C. Valve 23B (FIG. 3) would be enabled, filling lines 21A, 21B and cartridges 12A, 12B with cyan ink. Valve 22C is also enabled, filling lines 21C and 21D and cartridges 12C, 12D with black ink. A magenta highlight color could be similarly enabled by enabling valves 24B and 22A and repriming the appropriate lines.

Figure 6:
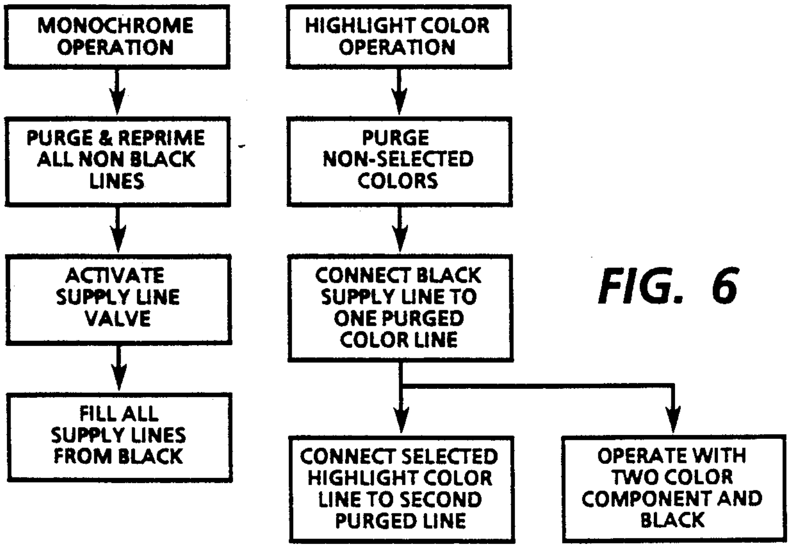
FIG. 6 is a flow chart of the operational steps for a monochrome or color highlighted operation.

For a highlighthed color mode, the carriage can be moved twice as fast (2X) as the prior art configuration of FIG. 1. Another form of highlight color operation is also consistent with the principles of the present invention. According to user preference, a color such as green may be preferred for the highlight color. For this mode, the magenta line 21C is purged and connected to the black ink supply line 21D via actuation of valve 22C and repriming of printhead 12C. The printer is then operated so as to create a pattern of alternating yellow and cyan ink droplets in the green-highlighted areas. The combination of closely positioned alternating yellow and cyan color spots effectively form a green output to the highlighted area. This configuration also provides a 2X increase in speed. The flow chart shown in FIG. 6 illustrates the steps for highlighted or monochrome operation.

Figure 7:
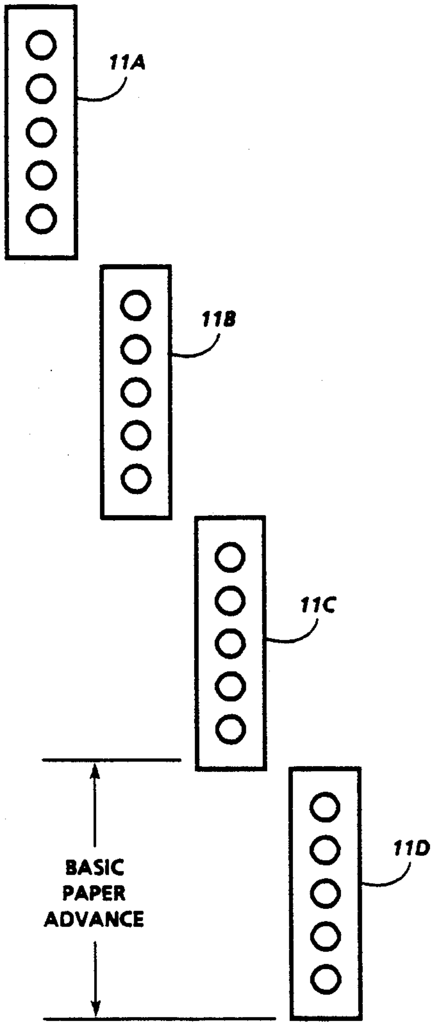
FIG. 7 shows printheads arranged in a vertical orientation relative to the recording medium travel.

The above description assumed that the printheads 11A–11D were arranged in a linear configuration shown in FIG. 1. The record medium vertical travel was constant for each mode selection but the carriage speed was changeable to realize the print speed enhancement. Other printhead configurations are possible consistent with the principles of the invention. FIG. 7, for example, shows a configuration where the printheads are arranged in a staggered vertical orientation. The printheads could also be vertically aligned. For this configuration, the vertical travel rate of the recording medium past the printheads is the controlling factor. The carriage carries the printheads from left to right at a constant speed in each mode. For the monochrome mode, the paper advance would be 4X the speed of the process color mode while for a highlight color mode, the paper advance would be 2X the process color speed. This speed relationship is valid if the printheads, for example, were horizontally linear page-width printheads lying in the same plane as the segmented printheads.

Figure 8:
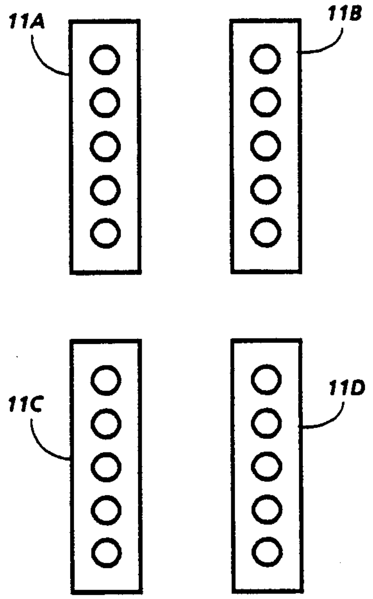
FIG. 8 shows printheads arranged in a square configuration.

A hybrid printhead configuration is shown in FIG. 8. Here the printheads are arranged in a square configuration. For a monochrome operation, both the carriage speed and the paper advance speed are 2X the respective process color speeds. For the highlight color mode, the paper advance is at the same rate as the process color but the carriage speed is 2x the process color rate.

In summary, a color ink printing system is described which has a versatility not previously realized in the art. An operator-initiated purge and refill system permits rapid changes between a full color, a monochrome, or a highlighted color mode. The operator controls the purging of selected lines and then refills selected lines with ink of a color suitable for the particular color mode selected. Optionally, colorless purging liquid can be used, purging of sections of ink supply and of printheads. The purge and refill principles can be enabled with a number of printhead configurations. While the description has concentrated on three operational modes, other color combinations are possible. For example, other highlight colors, such as red or blue, may be created.

What is claimed is:

1. A thermal ink jet printer including a reciprocating carriage adapted to convey a plurality of ink supply cartridges with integrally mounted thermal printheads forming a part thereof, means for stepping a recording medium a predetermined distance after each traversal of the carriage across the width of the recording medium, and means for propelling ink droplets from the nozzles of each printhead on demand, the printer further including:

a plurality of individual ink supply systems for supplying ink of a desired color to an associated ink cartridge, and means for purging at least one of said supply sytems of the ink supply contained therein and for filling said system with an ink from at least one of said other ink supply systems.

2. The thermal ink jet printer of claim 1, wherein said ink supply system includes ink reservoirs holding ink of a particular color, ink supply lines interconnecting the associated ink cartridges, and electronically controlled valves for controlling the ink flow between ink supply lines and the cartridges in response to signals generated by selection of a particular color printing mode.

3. The thermal ink jet printer of claim 1, wherein the printer includes at least four ink supply cartridges associated with a black, yellow, cyan and magenta ink, so as to enable a full-color process mode of operation at a base speed of 1X, operational control means for selecting a monochrome mode of operation, said purging means being responsive to selection of said monochrome mode to purge the supply systems containing the magenta, cyan and yellow inks and to reprime said supply sytems with ink from said black ink supply system, whereby the ensuing printing operation is enabled at a 4X rate.

4. The thermal ink jet printer of claim 3, wherein a highlight color mode of operation is enabled, said purging means being responsive to selection of said highlight color mode to purge the supply system of at least a first un-selected color supply system and reprime with ink from the black ink supply system.

5. The thermal ink jet printer of claim 4, wherein a second non-selected color supply system is purged and reprimed with ink from the selected highlight color system.

6. The thermal ink jet printer of claim 4, wherein the two remaining color systems are actuated so as to create a pattern of alternating droplets of the two colors to effectively form a mixed highlight color.

7. The thermal ink jet printer of claim 1, wherein the ink supply cartridge with thermal printheads are arranged in a vertical, staggered arrangement with respect to the recording medium.

8. The thermal ink jet printer of claim 5, wherein the ink supply cartridges are arranged in a linear row.

9. The thermal ink jet printer of claim 5, wherein the ink supply cartridges are arranged in a square configuration.

* * * * *